June 10, 1969  R. D. FOSKETT  3,449,588
PHOTOELECTRIC INCREMENTAL ENCODER PROVIDING OUTPUT INDICATION
OF AMOUNT AND DIRECTION OF RELATIVE
MOTION BETWEEN TWO MEMBERS
Filed March 14, 1966  Sheet 1 of 4

INVENTOR.
ROGER D. FOSKETT
BY
Weingarten, Arenbuch & LaKive
ATTORNEYS

INVENTOR.
ROGER D. FOSKETT

BY
Weingarten, Grenbech & Lahive

ATTORNEYS

INVENTOR.
ROGER D. FOSKETT

ATTORNEYS

INVENTOR.
ROGER D. FOSKETT

United States Patent Office 3,449,588
Patented June 10, 1969

3,449,588
PHOTOELECTRIC INCREMENTAL ENCODER PROVIDING OUTPUT INDICATION OF AMOUNT AND DIRECTION OF RELATIVE MOTION BETWEEN TWO MEMBERS
Roger D. Foskett, Winchester, Mass., assignor to Dynamics Research Corporation, Stoneham, Mass., a corporation of Massachusetts
Filed Mar. 14, 1966, Ser. No. 534,137
Int. Cl. G01d 5/34
U.S. Cl. 250—231         7 Claims

ABSTRACT OF THE DISCLOSURE

A pair of relatively rotatable discs ruled with alernately opaque and transparent sectors is positioned between a pair of light sources and a pair of photodetectors. Light from the two sources is directed toward the discs at different angles, so that one detector produces a signal out of phase with the signal from the other, the phase relationship providing an indication of the direction of movement and the number of electrical cycles produced by the detectors providing an indication of the amount of the relative movement.

---

This invention relates in general to incremental encoders and more particularly to a photoelectric incremental encoder providing an output indication of both the amount and direction of relative motion between two members.

Incremental encoders are devices which transform mechanical motion in one dimension into an electrical digital output. The amount of motion of an element is expressed in terms of the total number of electrical pulses or counts accumulated on the output. One type of encoder which has been extensively used is a photoelectric shaft encoder in which a pair of discs ruled with alternately opaque and transparent sectors is positioned between a light source and a light detector. Rotation of one of the discs with respect to the other then modulates the light transmitted from the source to the detector and the electrical waveform on the output terminals of the detector is converted by suitable circuitry into a train of pulses. Such encoders have found application in a wide variety of positional devices which include both navigational instrumentation and automatic systems for controlling machine processes.

In many of these appliactions not only the amount of motion but also the direction of the motion is important. A number of designs of incremental encoders have been developed which include this directional information. One approach for a shaft encoder utilizes a pair of discs with the number of sectors on one disc being one more than the number of sectors on the other disc. The photoelectric cells are then positioned 90° apart on the disc and because of the difference in the number of lines the waveform at one of the photoelectric stations is 90° out of phase with the waveform at the other. Whether the waveform at one station lags or leads that at the other station is then an indication of the direction of rotation. In another approach discs with the same number of lines are employed but are mounted eccentrically with respect to one another and this again achieves the effect that the waveform of the transmitted light at one point on the stationary disc is out of phase with the waveform at another. Both of these designs, however, involve change in the basic structure of the encoder and are accordingly somewhat expensive and difficult to accomplish.

The situation for linear encoders is very much the same. In linear encoders translational mechanical motion is converted into an electrical digital output and where this motion may be bi-directional an indication of the direction as well as the amount of motion is often required. This has been achieved in similar fashion to the rotary encoders either by having a different number of opaque and transparent sections per inch or by skewing the linear gratings with respect to one another.

It is therefore a primary object of the present invention to provide an efficient photoelectric incremental encoder producing an output indication of both amount and direction of motion.

It is another object of the present invention to provide a photoelectric incremental shaft encoder utilizing identical discs and providing an output indicative of both the amount and direction of rotation.

Broadly speaking, the incremental encoder of this invention is a photoelectric encoder which includes both a stationary and a moving member, each being ruled in identical fashion to provide a grating formed of alternately opaque and transmissive sections. In the case of the shaft encoder these two members would constitute an identical pair of discs, one being stationary and the other being fixed to the rotating shaft. These discs would be mounted concentrically so that there is no eccentricity involved. In the case of the linear encoder the two gratings would be aligned so that they would be in rectilinear superposition. The encoder would include at least one count station for providing an output indicative of the amount of rotation and this count station would include a light source and a photocell positioned on opposite sides of the pair of gratings. The light from the source is collimated to be incident upon the grating in a direction normal to the plane of the grating and the photocell is arranged to be nominally in a plane parallel to the grating. As in the usual configuration of optical incremental encoders, the gap between these gratings is maintained constant. The output signal from the photocell is converted into a series of pulses with the number of these pulses being indicative of the amount of motion of the fixed grating with respect to the movable grating. In order to increase the accuracy of the device a number of these stations may be positioned at intervals along or around the grating and since the gratings are aligned and have the same number of sections, then the waveform of transmitted light at each one of these stations should be in phase with that of the other count stations.

In addition to the count station each encoder includes at least one direction station. The direction station also includes a source of light disposed on one side of the pair of gratings and a photocell mounted on the opposite side of the pair of gratings with the photocell surface being substantially parallel to the plane of the gratings. In this instance, however, the light source is collimated to provide a beam of light which is incident on the gratings at an angle which differs from normal incidence. This angle is selected such that the waveform at the output of its photocell is electrically 90° out of phase with the waveform at the output of the photocells from the count stations. The manner in which this angle of light incidence is determined will be explained in more detail below. The output from the direction station is, then, a varying electrical signal which is 90° out of phase with the electrical signal from the photocell of the count station and the direction in which these signals are out of phase, that is which leads and which lags, is indicative of the direction in which the movable grating has moved with respect to the fixed grating.

Other objects and advantages will become apparent from the following detailed description when taken in conjunction with the accompanying drawing in which.

Figure 1:
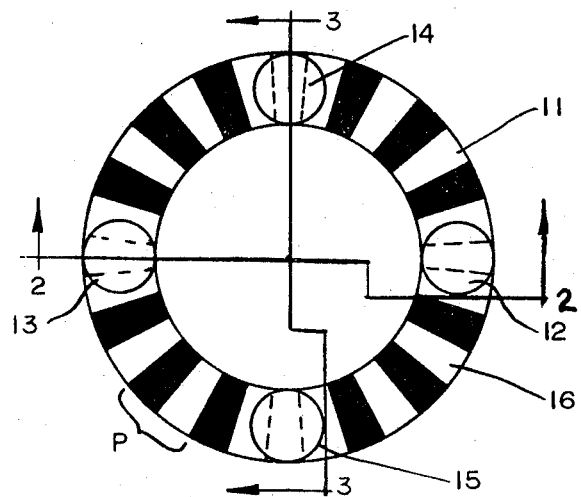
FIG. 1 is an illustration in diagrammatic form of the top view of a rotary encoder constructed in accordance with the principles of this invention.
Figure 2:
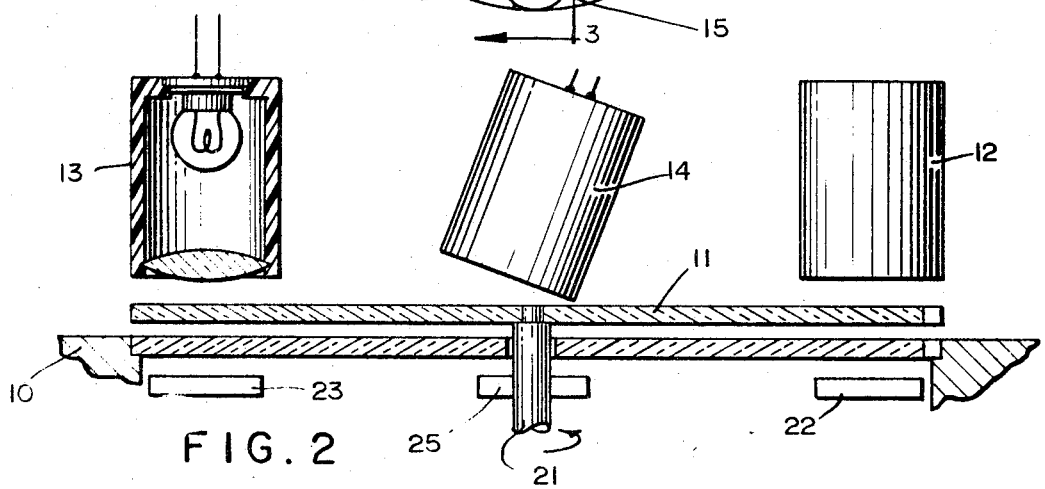
FIG. 2 is a digrammatic view of the encoder illustrated in FIG. 1 taken along the line 2—2 of FIG. 1.
Figure 3:
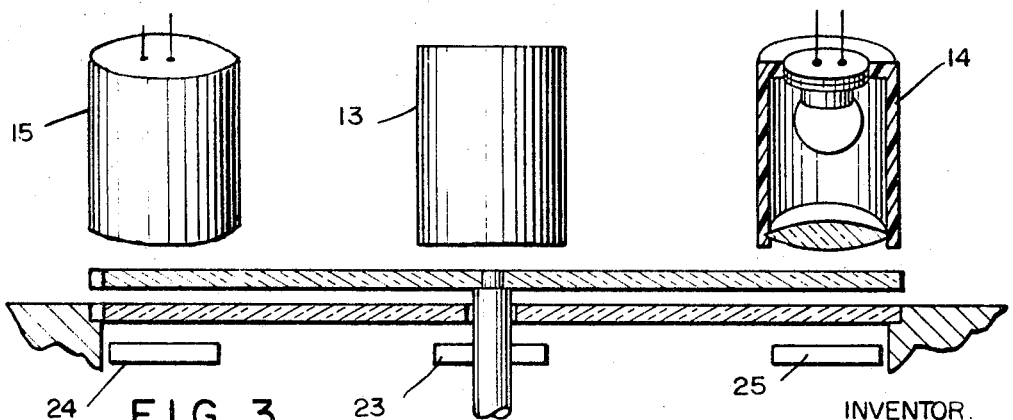
FIG. 3 is an illustration in diagrammatic form of a view of the encoder in FIG. 1 taken along the line 3—3 of FIG. 1.

The physical arrangement of the rotary encoder embodiment of this invention is shown in FIGS. 1, 2, and 3. Referring to these figures, a rotatable disc 11 is shown mounted on a shaft 21 such that it rotates with rotation of the shaft in either direction. A second disc 20, which is identical to the first disc, is mounted coaxially with the first disc but is mechanically fixed to the surrounding frame indicated generally at 10 and does not rotate with rotation of the shaft 21. Each of these discs is formed with a peripherally extending track 16 formed of alternately spaced equiangular opaque and transparent radial sectors. This track is located on the bottom surface of disc 11 and the upper surface of disc 20. Spaced on opposite ends of a diameter are a pair of collimated light sources 12 and 13 positioned to direct light onto the track 16 with the angle of incidence of the collimated light beam being normal to the plane of the disc 11. Located on the other side of disc 20 in a position directly beneath light sources 12 and 13 are photocells 22 and 23 respectively. Across another diameter are located a second pair of light sources 14 and 15; however these sources 14 and 15 direct collimated light at the track 16 not in a direction normal to the plane of the disc 11, but rather at an angle with respect to the normal to that plane with the angle inclined in the direction of the peripheral extension of the track. Light source 14 is angled toward light source 13 and light source 15 is angled also toward light source 13. A corresponding pair of photocells 24 and 25 are positioned beneath light sources 14 and 15, however the photocells 24 and 25 have their surface in a plane generally parallel to the plane of the discs 11 and 20. The combination of light source 12 and photocell 22 forms one count station as does the diametrically opposed pair 13 and 23. In order to operate a rotary encoder in accordance with the principles of the invention one such station would be sufficient and the second diametrically opposed station is not necessary. However, the addition of this station provides for increased accuracy in terms of disc ruling error and eccentricity of the track around the axis of rotation. The light source 14 and its corresponding photocell 25 form a direction sensing station and the diametrically opposed pair consisting of light source 15 and photocell 24 form a second direction sensing station. As in the case of the count stations one direction sensing station would be sufficient; however the addition of the second direction sensing station in the position and with the angle of inclination as shown makes this direction sensing less dependent upon tilt or wobble of the rotary disc.

While light sources 12, 13, 14, and 15 may take any of several forms, the use of a miniature lamp together with a collimating lens is a typical configuration. Photocells 22, 23, 24 and 25 may be any one of a number of photoelectric elements, one preferred example being a silicon solar cell.

In operation rotation of disc 11 with respect to disc 20 modulates the light passed from light sources 12 and 13 to their respective photocells producing a waveform which is at a minimum value when the opaque sectors of disc 11 overlie the transparent sectors of disc 20 and which is at a maximum when the opaque sectors of disc 11 directly overlie the opaque sectors of disc 20. Since the discs are identical and are coaxially mounted, then the output waveform does not vary around the periphery of the disc and hence the output signal from the photocell 22 is in phase with the output signal from the photocell 23. From this it follows that the light source-photocell pair 13, 23 need not be positioned diametrically opposite the light source-photocell pair 12, 22, but may be positioned anywhere around the disc. The output from the photocells 22 and 23 ideally has a triangular waveform such as that shown in A in FIG. 5. In practice, however, light diffraction and similar factors cause this waveform to appear more sinusoidal than triangular. One period of this waveform corresponds to the motion of the rotatable disc 11 which displaces the periphery of the disc a distance equal to one pair of sectors, that is, one opaque and one transparent sector. This distance is indicated on FIG. 1 by the bracket labelled P.

The light source 14 and its corresponding photocell 25 form a direction sensing station as does the light source 15 together with its photocell 24. As above stated, each of these light sources is inclined at an angle with respect to the track 16 with the inclination being in both instances toward the light source 13. The angle of incidence is selected such that light rays which are transmitted through rotatable disc 11 to strike disc 20 are incident upon the disc 20 at a point displaced from the point of incidence of that ray on disc 11 and in a direction along the track 16 and toward the light source 13. If the amount of displacement is equal to P/4, this will provide, from each of the photocells 24 and 25, a waveform which is 90° out of phase with the waveform from the count station. Since both of the light sources 14 and 15 are angled toward the same count station light source 13, then the waveform from photocell 25 will be 180° out of phase with the waveform from photocell 24. By connecting these outputs in parallel opposition, variations in the 90° phase difference from the count stations due to tilt of the rotatable disc or wobble in the rotation of the rotatable disc tend to be eliminated. The correct angle of incidence can readily be calculated from the relationship $\tan \alpha = P/4d$ where $\alpha$=the angle between the axis of the light beam from the light sources 14 and 15 with respect to the normal to the plane of disc 11;

P=the width of the pair of sectors in the direction of extension of the track 16; and d=the gap between the bottom surface of disc 11 and the upper surface of disc 20.

In those cases where the dimension d is the same order of magnitude as the dimension P, the angle $\alpha$ is small and hence $\tan \alpha$ is approximately equal to $\alpha$. In a typical example the disc diameter might be three inches and with 4096 pairs of sectors P would equal .002 inch. With a gap d equal to .005 inch then $\alpha$ would equal .1 radians or 5.7°.

Figure 5:
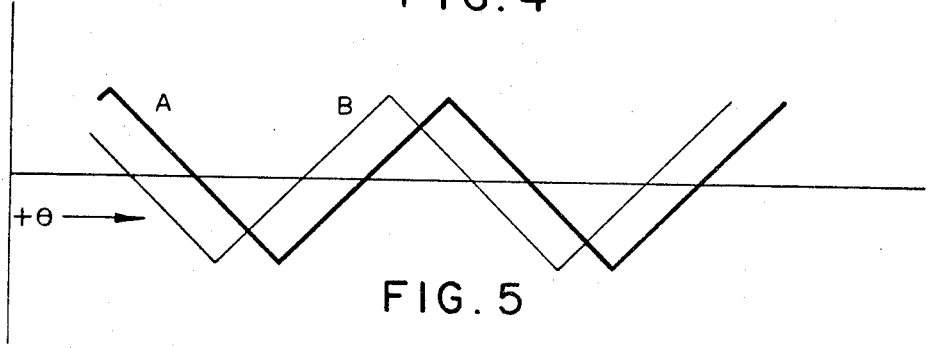
FIG. 5 is a graphical representation of output waveforms from an encoder constructed in accordance with the principles of this invention.

Referring now to FIG. 5, the output waveform from the pair of photocells 22 and 23 connected in parallel opposition is shown as curve A while the output waveform from cells 24 and 25 connected in parallel opposition is shown as curve B. As will be described in more detail below, circuitry is provided which produces an output pulse for each crossing by curve A of the zero base line and the accumulation of these pulses is used as the count output indicative of the amount of rotation. When the rotation is in one direction, indicated in FIG.

5 as a $+\theta$ rotation, then curve A will have a 90° phase lag with respect to curve B, as illustrated. If on the other hand the rotation direction were in a $-\theta$ direction then curve A would of course lead curve B by 90°. The phase relationship between curves A and B is therefore indicative of the direction of rotation.

Figure 6:
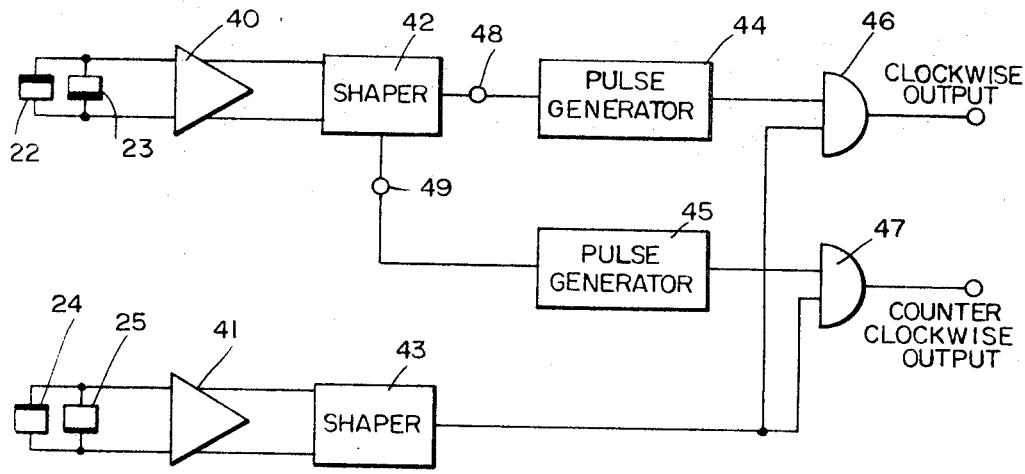
FIG. 6 is an illustration in block diagrammatic form of circuitry suitable for use in the encoder of this invention.

Circuitry suitable for use in conjunction with the encoder illustrated in FIGS. 1, 2, and 3 is shown in FIG. 6 in block diagram form. The photocells 22 and 23 connected in parallel opposition are coupled across the input terminals of a differential amplifier 40 and the output from the amplifier 40 is connected to a shaper circuit 42. The shaper circuit 42 takes the output from the amplifier 40 which is approximately sinusoidal and converts it to a square wave of the same frequency and phase. The shaper 42 provides a first output on terminal 48 which is connected to pulse generator 44. The pulse generator 44 is a circuit which provides for each negative edge of the square wave a short negative pulse, typically having a duration substantially less than one-quarter cycle of the square wave at maximum rotation speed of the disc. The output of pulse generator 44 is applied to one of the input legs of AND gate 46. Shaper 42 provides a second output on terminal 49. Again, this is a square wave of the same frequency as the input sine wave; however, in this instance this square wave is 180° out of phase with the square wave output appearing on terminal 48. The output terminal 49 from shaper 42 is connected to a second pulse generator 45 which is identical with pulse generator 44 and the output from this pulse generator 45 is applied to one input leg of another AND gate 47.

The directional photocells 24 and 24 are connected in parallel opposition across the input terminals of a second differential amplifier 41 which has output terminals connected to a shaper circuit 43. The shaper circuit 43 is identical to shaper 42 except that it provides only one output with this output being in phase with the sine wave output from amplifier 41. The output from shaper 43 is connected to the second input legs of both AND gate 46 and AND gate 47. The output from AND gate 46 serves as the clockwise count output while the output from AND gate 47 serves as the counterclockwise count output.

In operation, rotation of the disc 11 in one direction produces, at the output of differential amplifier 40, a sine wave which in turn results in a series of pulses from pulse generator 44 and also a series of pulses from pulse generator 45. The number of pulses produced in any time interval will equal the number of cycles of the sine wave during the interval. As previously described, one cycle of the sine wave is generated for each increment of motion over a distance equal to one pair of sectors. The total number of pulses produced is then equal to the number of sector pairs displaced. Since the pulses from pulse generators 44 and 45 are both generated on the negative going edge of their input square waves and since these square waves are 180° out of phase, then the pulses at the output of pulse generator 45 will be separated from the pulses occurring at the output of pulse generator 44 by an interval equal to the duration of one-half cycle of the square wave. Each of the AND gates 46 and 47 provides an output signal when both of its input legs are negatively biased. The determination, then, of which AN gate provides an output for each count originating in count cells 22 and 23 depends upon whether the pulse from generator 44 or from generator 45 occurs when the square wave output from shaper 43 is at a minimum value. It can be seen that when the disc 11 is rotating in one direction such that the waveform from the photocells 24 and 25 has a phase lead of 90° over the waveform from photocells 22 and 23, then the negative going portion of the square wave from shaper 43 occurs prior to the negative going portion of the square wave from shaper 42 by one-quarter of a cycle and hence when the pulse is generated from pulse generator 44 there is a negative bias on AND gate 46 and the output pulse appears on the clockwise output. On the other hand, since the pulses from pulse generators 44 and 45 are substantially less than one-quarter of a cycle in duration, even at the maximum speed of rotation, then, at the time that the square wave output from shaper 43 becomes negative, there can be no pulse from pulse generator 45 on the input leg to AND gate 47 and there is therefore no output on the counterclockwise output terminal from AND gate 47. Conversely, when the direction of rotation is reversed, the negative going edge of the square wave from shaper 43 lags by 90° the negative going edge from shaper 42 applied to pulse generator 44 and hence the output pulses from pulse generator 44 occur without any negative bias being on AND gate 46. In this instance, however, the square wave output which appears on terminal 49 of sharper 42 has a phase lag of 90° with respect to the square wave from shaper 43 and accordingly pulses from pulse generator 45 are applied to one input leg of AND gate 47 when the other input leg is negatively biased and these output pulses then appear on the counterclockwise output.

Figure 7:
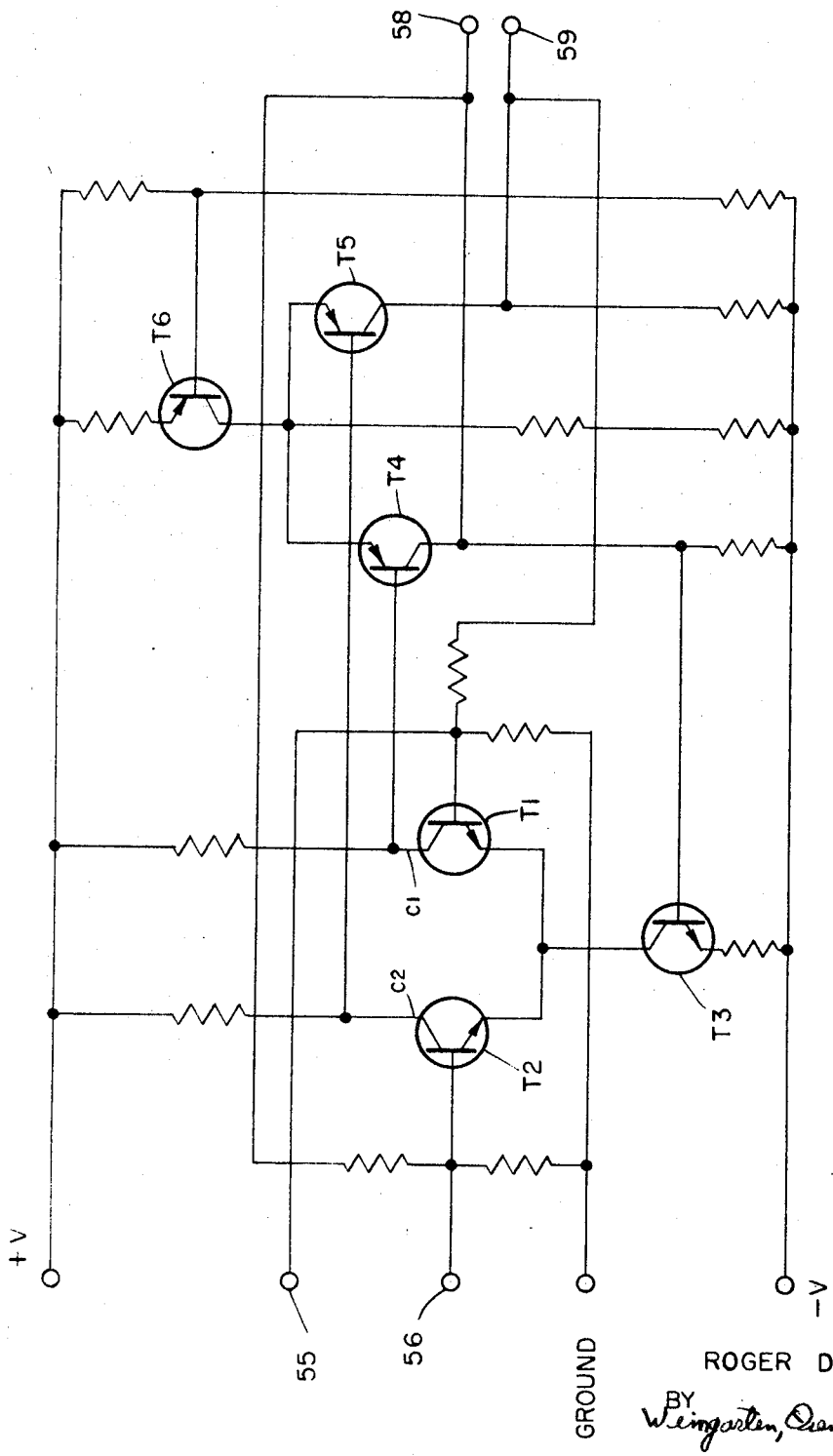
FIG. 7 is an illustration in schematic form of an amplifier circuit suitable for use in the circuitry shown in FIG. 6.

In FIG. 7 there is illustrated in schematic form an amplifier circuit suitable for use as the amplifiers 40 and 41 in the block diagram of FIG. 6. The amplifier of FIG. 7 is a differential transistor amplifier stabilized by negative feedback. The input terminals to the amplifier are designated in FIG. 7 as 55 and 56 with terminal 55 being connected to the base 50 of transistor T1 and terminal 56 being connected to the base 51 of transistor T2. Transistors T1 and T2 together with current regulating transistor T3 form an input push-pull amplifier stage. The output from this stage is taken from the collectors C1 and C2, respectively, of transistors T1 and T2 and these outputs are coupled through an output driver stage including transistors T4, T5 and current regulating transistor T6 with the output signal then appearing at terminals 58 and 59.

Figure 8:
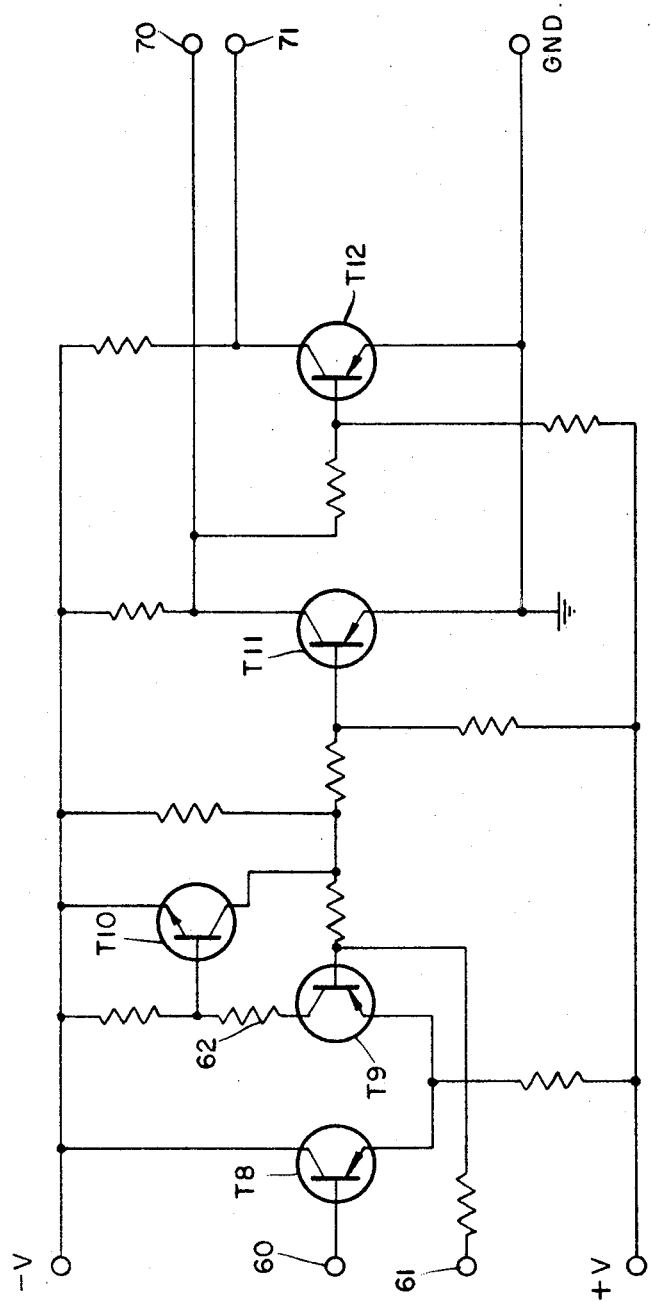
FIG. 8 is an illustration in schematic form of a shaper circuit suitable for use in the circuitry illustrated in FIG. 6.

FIG. 8 is a schematic illustration of a shaper circuit suitable for use as the shaper circuits 42 and 43 in FIG. 6. The purpose of this shaper circuit is to convert a sine wave signal appearing across the input terminals 60 and 61 into a pair of square wave output signals, one appearing between terminal 70 and ground and the other square wave appearing between the terminal 71 and ground. The output square waves are 180° out of phase. The input terminals 60 and 61 are connected to the bases of a pair of transistors T8 and T9, respectively, and these transistors T8 and T9 have a common emitter connection such that they form a bi-stable circuit. Transistor T10 which has its base connected through resistor 62 to the collector of transistor T9 provides positive feedback to the base of transistor T9 as well as providing the driving signal to the base electrode of transistor T11. Transistor T11 is an amplifier stage which conducts when transistor T9 is conducting and the collector of this tranistor T11 is connected directly to output terminal 70 as well as to the base of transistor T12. Transistor T12 also is an amplifying stage which, however, conducts when transistor T8 of the input stage is conducting and its collector is connected directly to the output terminal 71.

In operation of the shaper circuit, if the voltage on terminal 60 becomes positive with respect to that terminal 61, transistor T9 becomes conucting, thus rendering transistor T11 conducting and causing the voltage on output terminal 70 to increase sharply to its maximum positive value. This applies a positive bias to the base of transistor T12 thus cutting off transistor T12 and the voltage on output terminal 71 decreases to a value of about $-V$. This condition continues until the voltage at input terminal 60 with respect to that at input terminal 61 becomes negative and, at this time, transistor T8 becomes conducting and transistor T9 becomes cut off. When transistor T9 and hence transistor T10 are nonconducting, the negative bias on the base of transistor T11 is decreased, thereby cutting off transistor T11 which causes the voltage at output terminal 70 to become negative. This negative voltage also acts as a bias on the base of transistor T12 thereby rendering this transistor conducting and output terminal 71 therefore assumes its maximum positive value of voltage.

Figure 4:
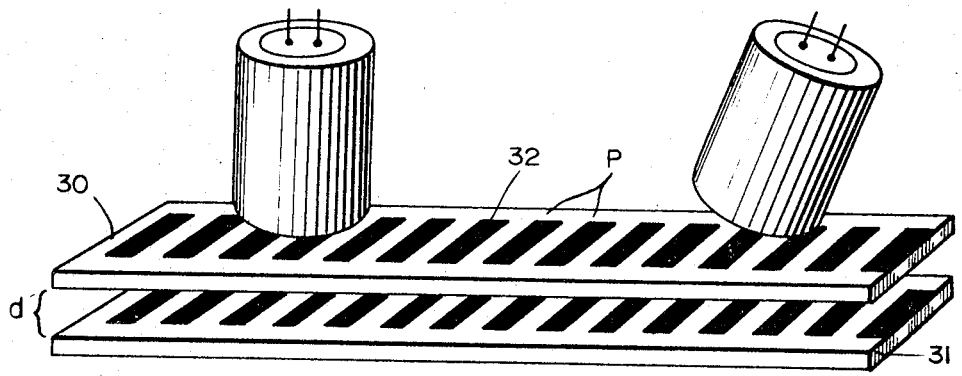
FIG. 4 is an illustration in diagrammatic form of a linear encoder constructed in accordance with the principles of this invention.

The encoder illustrated in FIGS. 1, 2, and 3 as described above is a rotary encoder; however, the invention also may be embodied in a linear encoder. Referring now to FIG. 4, a linear encoder is illustrated which includes two relatively movable rectilinear elements 30 and 31. Each of these elements is identical and contains an identical grating 32 extending along its longitudinal axis. The grating is formed of alternately light opaque and light transmissive sections and the two elements 30 and 31 are spaced apart a fixed distance, are parallel to one another and laterally aligned so that relative movement between them is confined to bi-directional movement along the direction of the longitudinal axis. A collimated light source 37 is positioned above the element 30 and directs collimated light onto the grating 32 with the angle of incidence being normal to the plane of the element 30. A photocell (not shown) is positioned directly beneath element 31 in alignment with the light source 37. Sliding motion of element 30 (which is considered to be the movable element with respect to the fixed element 31 results, as in the case of a rotary encoder, in modulation of the transmitted light thereby producing on the output of the photocell a triangular waveform with one period of the waveform being generated for a translational movement equal to the distance P which includes the width of one opaque and one transparent section. A second light source 35 is also positioned above the element 30 and directs collimated light onto the grating 32. However, in this instance the collimated light is incident on the grating at an angle with respect to the normal to the plane of the element 30 and, as in the rotary embodiment, this angle is selected according to the dimensions P and $d$ so that the waveforms produced on the photocells aligned with light sources 35 and 37 respectively are displaced in phase by 90°, with the phase leading or lagging depending on the direction of sliding motion.

While the invention has been described in terms of a count station with light rays striking the grating at normal incidence and a direction station with light rays striking the grating at an angle, other configurations can be used, provided that the angular difference between light rays from the two stations produces a 90° phase difference in the output from their photocells. The use of a count station having light striking the disc at normal incidence is, however, preferred since in this arrangement, the accuracy of the count information does not have a first order dependence on the separation between the discs.

Having described the invention, various modifications and improvements will now occur to those skilled in the art and the invention described herein should be construed as limited only by the spirit and scope of the appended claims.

What is claimed is:

1. A transducer for providing output signals indicative of the amount and direction of relative movement between two members in one dimension comprising, first and second members movable relative to one another in one dimension and in either direction;

a first grating fixed to said first member, said first grating extending along the dimension of movement of said first member, said first grating being formed of an alternating series of light opaque and light transmissive sections;

a second grating identical with said first grating, said second grating being fixed to said second member, the surfaces of said first and second gratings being fixed in spaced-parallel relationship and aligned with one another;

a first light source directing collimated light onto said grating, said collimated light being incident on said grating at a first angle with respect to the plane of the surface of said grating;

a first light detector positioned to receive light transmitted from said first light source through said gratings, said first light detector producing a varying electrical signal in response to relative motion between said first and said second members, said electrical signal varying through one complete cycle for a relative displacement between said first and said second member equal to the width of one opaque and one transmissive section;

a second light source directing collimated light onto said grating;

a second light detector positioned to receive light transmitted from said second light source through said gratings, said light rays from said second light source being incident on said grating surface at a second angle with respect to the plane of said grating surface, the respective values of said first and second angles being such that the varying electrical signal produced by said second light detector in response to relative motion between said first and said second members is 90 electrical degrees out of phase with the electrical signal produced at said first light detector, the number of electrical cycles produced by said light detectors providing an indication of the amount of relative movement between said first and said second members and the phase relationship between the output electrical signals from said first and said second detectors providing an indication of the direction of said movement;

and circuit means coupled to said first and second light detectors for deriving from their output signals an output indication of the amount of relative movement between said first and second members and the direction of said movement.

2. Apparatus in accordance with claim 1 wherein said first and second members are a pair of planar discs coaxially mounted and rotatable relative to one another and wherein said first and second gratings comprise a series of equiangular radial sectors forming a continuous circular grating around the periphery of said discs.

3. Apparatus in accordance with claim 2 and further including a third light source diametrically positioned with respect to said second light source and a third light detector positioned to receive light transmitted from said third light source through said gratings, said third light source being collimated such that light rays are incident upon said grating surface at a third angle, the direction of inclination and value of said third angle being such that the electrical signals produced by said third light detector in response to relative movement between said first and said second discs is 180 electrical degrees out of phase with the electrical signals produced by said second light detector in response to the same movement of said disc.

4. Apparatus in accordance with claim 1 wherein said circuit means includes first and second output terminals, said circuit means converting said electrical signal from one of said light detectors into a series of discrete pulses, said circuit means acting to direct said discrete pulses onto one of said output terminals in response to motion in a first direction and onto the second one of said output terminals in response to motion in the opposite direction.

5. Apparatus in accordance with claim 1 wherein the angular difference between said first and second angles is equal to the angle whose tangent is equal to the fraction $P/4d$, where P is equal to the distance in the direction of extension of said grating of one opaque and one transmissive section, and $d$ equals the spacing between the parallel surfaces of said gratings.

6. Apparatus in accordance with claim 1 wherein said first angle is 90°.

7. Apparatus in accordance with claim 2 wherein, said first light source is directing collimated light onto said grating at a first angle equal to 90° and wherein said light rays from said second light source are incident on said grating surface at a second angle which is inclined with respect to normal incidence by an angle defined as the angle whose tangent is equal to $P/4d$, where P is equal to the distance in the direction of extension of said grating of one opaque and one transmissive sector, and $d$ equals the spacing between the parallel surfaces of said gratings, the direction of the angular inclination of said light rays being in a first direction along the line of extension of said grating;

said apparatus further including a third light source diametrically positioned with respect to said second light source and a third light detector positioned to receive light transmitted from said third light source through said gratings, said third light source being collimated such that its light rays are incident upon said grating surface at the same angle as the light rays from said second light source, along the same line of extension of said grating, and in said first direction.

References Cited
UNITED STATES PATENTS

| | | | |
|---|---|---|---|
| 3,058,001 | 10/1962 | Dertouzos | 250—231 |
| 3,111,841 | 11/1963 | Gray | 250—231 |
| 3,116,886 | 1/1964 | Kuehne | 250—231 |
| 3,193,744 | 7/1965 | Seward | 250—231 |
| 3,234,394 | 2/1966 | Worden | 250—219 |

ROBERT SEGAL, *Primary Examiner.*

U.S. Cl. X.R.

250—220, 233